United States Patent
Piernot (10) Patent No.: US 8,626,853 B2
(45) Date of Patent: Jan. 7, 2014

(54) METHOD AND SYSTEM FOR LINK-TRIGGERED LINK-TRANSLATING PROXYING

(75) Inventor: Philippe Piernot, Palo Alto, CA (US)

(73) Assignee: Unwired Planet, LLC, Reno, NV (US)

( * ) Notice: Subject to any disclaimer, the term of this patent is extended or adjusted under 35 U.S.C. 154(b) by 156 days.

(21) Appl. No.: 13/005,451

(22) Filed: Jan. 12, 2011

(65) Prior Publication Data

US 2012/0030294 A1    Feb. 2, 2012

Related U.S. Application Data (60) Provisional application No. 61/406,564, filed on Oct. 25, 2010, provisional application No. 61/368,341, filed on Jul. 28, 2010.

(51) Int. Cl.
  *G06F 15/16* (2006.01)
(52) U.S. Cl.
  USPC .......................................................... 709/206
(58) Field of Classification Search
  USPC .......................................................... 709/206
  See application file for complete search history.

(56) References Cited

U.S. PATENT DOCUMENTS

| | | |
|---|---|---|
| 2002/0065938 A1 | 5/2002 | Jungck et al. |
| 2003/0126198 A1 | 7/2003 | Tenereillo et al. |
| 2004/0233930 A1 * | 11/2004 | Colby, Jr. ...................... 370/464 |
| 2004/0267961 A1 | 12/2004 | Dietz et al. |
| 2006/0031942 A1 | 2/2006 | Jones et al. |
| 2007/0016949 A1 | 1/2007 | Dunagan et al. |
| 2007/0124500 A1 | 5/2007 | Bedingfield, Sr. et al. |
| 2007/0136279 A1 | 6/2007 | Zhou et al. |
| 2009/0070873 A1 | 3/2009 | McAfee et al. |

OTHER PUBLICATIONS

International Search Report and Written Opinion, PCT/US11/45683, Jul. 28, 2011.
Ziqing Mao, Cormac Herley, "A Robust Link-Translating Proxy Server Mirroring the Whole Web", SAC'10, Mar. 22-26, 2010, p. 1-8.
http://bytemobile.com/products-applications/wfs-widget-bar-overview.html, "Influence Mobile Web Browsing for New Revenue Streams", Bytemobile, Inc., 2010, p. 1-2.
International Search Report and Written Opinion, PCT\US2011\045709, Jul. 28, 2011.

* cited by examiner

*Primary Examiner* — Tamara T Kyle (57) ABSTRACT

A method for obtaining web content at an Internet-connected device from an Internet accessible content source, wherein the device connects to the Internet via an access network, is described. The method involves obtaining, at the device, a link to a content element that is stored at the content source, wherein the link includes a pointer to a link-translating proxy server (LTPS) that is located outside of the access network and additional information that corresponds to a Universal Resource Locator (URL) for the content element. The method also involves initiating, from the device, a request for the content element that is associated with the link, the request being directed to the content source through the LTPS, and receiving, at the device, a response that includes the requested content element, the response passing through the LTPS.

21 Claims, 8 Drawing Sheets

METHOD AND SYSTEM FOR LINK-TRIGGERED LINK-TRANSLATING PROXYING

CROSS-REFERENCE TO RELATED APPLICATION

This application is entitled to the benefit of provisional U.S. patent application Ser. No. 61/406,564, filed Oct. 25, 2010 and provisional U.S. patent application Ser. No. 61/368, 341, filed Jul. 28, 2010, both of which are incorporated by reference herein.

BACKGROUND

Advances in Internet and wireless technologies have triggered an exponential upsurge in the amount of content that is available to wireless devices. Different content types, such as video, audio, and webpage, pose different demands for quality of service (QOS). In addition, with the explosion of video traffic, wireless service providers are faced with the challenge of effectively managing exponential growth in data traffic.

Link-translating proxy servers are known to be used to enable anonymous browsing, policy circumvention, and WebVPN functions. An example of a link-translating proxy server is described in "A Robust Link-Translating Proxy Server Mirroring the Whole Web," by Ziqing Mao and Cormac Herley, SAC '10 Mar. 22-26, 2010, Sierre, Switzerland, which is incorporated by reference herein. This technique is an address-bar-only proxy technique because the address bar of a browser is used to direct traffic through the proxy server.

In order to support wireless devices, a proxy server, such as a link-translating proxy server (LTPS), can be located in the data path of a wireless service provider network. This ensures that any traffic that passes from a wireless device through the wireless service provider network can be affected by the proxy server. One drawback to this scenario is that the proxy server is exclusively within the control domain of the wireless service provider network. Another drawback with this approach is that the proxy server will be bypassed when a wireless device communicates through a local wireless hotspot, e.g., a WiFi or WiMax hotspot, which provides wireless access to the Internet but is not within the control domain of the wireless service provider network.

In another configuration, a proxy server can be located outside of the control domain of the wireless service provider network. In this configuration, the internal proxy settings of each wireless device are typically configured by the user to direct the desired communications to the proxy server. Changing the internal proxy settings of a wireless device takes know-how on the part of the wireless device user and can be such an inconvenience that it discourages use of a proxy server. Additionally, some wireless device operating systems and/or wireless device browsers do not allow a user to change the proxy settings. Additionally, in some corporate environments, traffic is forced to go through a corporate proxy, thus making it difficult to add a second proxy in the data path since the proxy settings are already consumed by the corporate proxy.

SUMMARY

Embodiments of a method are also described. In one embodiment, a method for obtaining web content at an Internet-connected device from an Internet accessible content source, wherein the device connects to the Internet an access network, is described. The method involves obtaining, at the device, a link to a content element that is stored at the content source, wherein the link includes a pointer to a link translating proxy server (LTPS) that is located outside of the access network and additional information that corresponds to a Universal Resource Locator (URL) for the content element, initiating, from the device, a request for the content element that is associated with the link, the request being directed to the content source through the LTPS, and receiving, at the device, a response that includes the requested content, the response passing through the LTPS. Other embodiments of a method are also described.

Embodiments of a system are described. In one embodiment, LTPS is described. The LTPS includes a proxy domain that is outside an access network, a processor, and memory. The memory stores computer program code which, when executed by the processor, performs the following operations receiving, via the Internet, a request from a device for a content element that is associated with a link, the link, as received, including a pointer to the LTPS and additional information that corresponds to a URL for the content element, obtaining the URL for the content element using the additional information, sending a request to a content source using the URL for the content element, receiving a response from the content source, the response including the requested content, modifying the response, and forwarding the response to the device. Other embodiments of a system are also described.

Embodiments of a content source that stores Internet accessible content are described. In one embodiment, the content source includes memory that stores a content element and memory that stores an Internet accessible link to the content element, wherein the link includes a pointer to a LTPS that is located outside of an access network and additional information that corresponds to a URL for the content element. Other embodiments of a system are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

In accordance with an embodiment of the invention, a technique for link-triggered link-translating proxying is disclosed. In an embodiment, a link-translating proxy server (LTPS) is located outside of an access network, such as a wireless service provider network or an Internet Service Provider (ISP) network, and the user of an Internet-connected device, such as a wireless Smartphone, obtains a link, also known as a hyperlink, that has been modified to include a pointer to the link-translating proxy server and additional information that corresponds to a URL for a desired content element. The user of the device activates the link (e.g., clicks on the link or copies the link into the address bar of the device's browser) and a request (e.g., an HTTP request) is directed to the corresponding LTPS, which is outside the control domain of the access network. The request includes the additional information (e.g., in the header of an HTTP request) and the LTPS uses the additional information to obtain a URL for the content element. The LTPS then obtains the content, which is indicated in the request, from the content source and provides the requested content to the device while acting as the LTPS. In addition, links that are included in the requested content are rewritten/replaced to include a pointer to the LTPS so that subsequent activation of a displayed link triggers a request that passes through the LTPS. The technique is applicable to downloading content to a device via both wired and wireless access networks. For example, the technique is applicable to downloading content to a wireless device that accesses the Internet via a wireless service provider network and the technique is applicable to downloading content to a computer that accesses the Internet via a traditional Internet Service Provider (ISP).

An exemplary embodiment of a technique for link-triggered link-translating proxying is described below with regard to wireless devices and a wireless service provider network as the access network. According to the embodiment:

1. A user of a wireless device obtains and activates a link, also known as a hyperlink, such as, http://www.website.com.pr0xy.me/about_us/index.html, which includes the proxy domain, "pr0xy.me," appended to the hostname, "www.website.com," of the content source. The user can obtain the link in a few ways, for example: the link was bookmarked, the link was sent via Instant Message (IM)/Short Message Service (SMS)/Multimedia Messaging Service (MMS)/email, the link was obtained via a social network association (e.g., TWITTER, FACEBOOK), the link was found on a web page, a content provider uses such links, a URL shortening service uses this system, the user enters the link into the address bar of the device browser by hand.

2. The LTPS having the proxy domain, pr0xy.me, receives the request and runs a web server (e.g., Java) that translates the information in item 1 to remove the proxy domain and fetches the associated content from the corresponding content source. For example, the URL in item 1 is changed to the URL http://www.website.com/about_us/index.html and the requested content is obtained from the content source identified by the destination hostname "www.website.com."

3. Once the corresponding response (e.g., HTTP response) is received from the content source, the LTPS, at pr0xy.me, rewrites/replaces all of the links in the response using the format listed in item 1. For example, a link to http://www.website.com/contact_us.html, which is embedded in the requested content, is rewritten/replaced with the link http://www.website.com.pr0xy.me/contact_us.html. In this particular embodiment, relative links do not need to be rewritten but this is not always the case. In an embodiment, the link rewriting/replacing occurs for Hyper Text Markup Language (HTML), Cascoding Style Sheets (CSS), Extensible Markup Language (XML), and/or Javascript Multipurpose Internet Mail Extension (MIME) types. In one embodiment, the links in the requested content are searched for and rewritten/replaced by the LTPS itself and then sent to the wireless device in the rewritten/replaced form. In another embodiment, the response is modified by the LTPS so that the wireless device itself searches for and rewrites/replaces the links. For example, the LTPS inserts a script (e.g., JavaScript) or a reference to a script into responses of content type HTML or XHTML. The script includes program instructions that cause the wireless device itself to search and rewrite/replace the links of the displayed content. In an embodiment, the LTPS, pr0xy.me, also passes through the HTTP headers, rewriting some of the headers as required (e.g. set-cookie, set-cookie2, refresh, location, referer, etc.).

4. The LTPS, pr0xy.me, can also run applications that modify the content of the response (e.g., can perform a language translation) and/or can inject a script or a reference to a script into the response. For example, the LTPS can inject an application and/or an application launcher toolbar into the response.
5. The LTPS, pr0xy.me, then returns the modified content (in the form of, for example, a web page, HTML page, Really Simple Syndication (RSS) feed, CSS, and/or Javascript), to the browser of the requesting wireless device.

Because the technique is triggered by the wireless device activating a link that includes the proxy domain appended to the destination hostname, the LTPS can be located outside of the access network, e.g., the wireless service provider network. That is, the link that is activated by the wireless device can point to any location accessible through the Internet. Therefore, the technique is not dependent on the request passing through a LTPS that is located in the data path of the access network, e.g., the wireless service provider network. Additionally, because the technique is triggered by a specific link being activated by a wireless device (e.g., a link with the proxy domain appended to the destination hostname), the technique works independent of whether the wireless device is making the request via the wireless service provider network or via a local wireless hotspot (e.g., WiFi or WiMax hotspot) that offers wireless access to the Internet. That is, the request will still be directed to the LTPS if the request is made by the wireless device through a WiFi or WiMax wireless connection instead of a wireless connection to the wireless service provider network.

Further, because the technique is an address-bar-only proxy technique that is triggered by a link, which is activated at the wireless device, the internal proxy settings of the wireless device do not have to be changed or specially configured to point to the LTPS. All that is necessary is that a proper link (e.g., a URL with the proxy domain appended to the destination hostname) is entered into the address bar of the wireless device browser. That is, no changes need to be made to the configuration of the wireless device. The link, which includes the domain name of the LTPS appended to the destination hostname, can be obtained in many different ways including, for example, the link is bookmarked in the web browser of the wireless device, the link is obtained at the wireless device via IM/SMS/MMS/email, TWITTER, FACEBOOK, etc., the link was found on a web page, a content source uses such links, a URL shortening system uses this system. The link could also be entered by hand into the address bar of the wireless device browser. The above-described link-triggered link-translating proxying works even if the wireless device operating system and/or browser do not allow the user to change the proxy settings of the wireless device.

Although the link is described above as including the proxy domain appended to the destination hostname, the link can include any type of pointer to the LTPS combined with some additional information that corresponds to the URL for the desired content. In one embodiment, the additional information that corresponds to the URL of the desired content element is the URL itself. However, in other embodiments, the additional information can be some abstract information, such as a key, that is associated with the URL so that the URL can be obtained from the key. For example, the key can be mapped to the corresponding URL and the mapping can be stored in the LTPS. Additionally, the additional information in the link does not have to be in any particular order in the link and it does not have to be contiguous. Examples of various different links that include a pointer to a LTPS and additional information that corresponds to the URL of the desired content element are provided in Table 1.

TABLE 1

| Link | Pointer to LTPS | Additional information that corresponds to the URL of a content element |
|---|---|---|
| http://www.website.com.pr0xy.me/about_us/index.html | pr0xy.me | www.website.com and /about_us/index.html |
| http://www.pr0xy.me/?url=website.com/about_us/index.html | pr0xy.me | /?url=website.com/about_us/index.html |
| http://www.pr0xy.me/123456789 | pr0xy.me | /123456789 |
| http://www-website-com.pr0xy.me/?path=/about_us/index.html | pr0xy.me | www-website-com and /?path=/about_us/index.html |
| http://www.pr0xy.me/?encryptedURL=dnfhekdbmdhdbksbfhjslsdndfbdjdbdbdj | pr0xy.me | /?encryptedURL=dnfhekdbmdhdbksbfnjslsdndfbdjdbdbdj |

In the example, in row 3, the additional information is simply a string of numbers, or a key, which is mapped to or associated with a URL for the desired content element. In an embodiment, the key is used by the LTPS to identify the URL for the desired content. In this case, the LTPS maintains a list of key/value pairs, the key being an arbitrary text string and the value being the URL itself.

Figure 1:
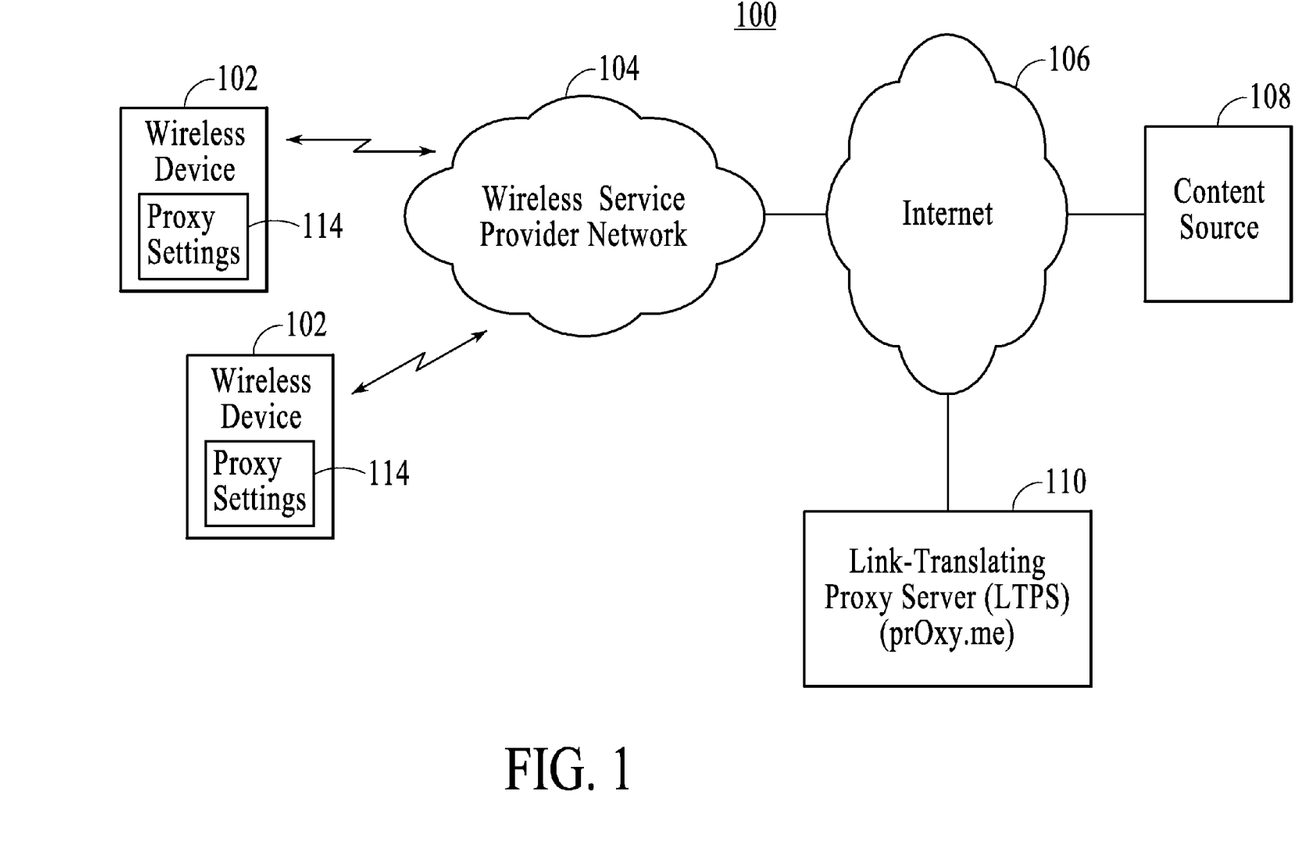
FIG. 1 depicts an embodiment of a system that utilizes link-triggered link-translation proxying.

FIG. 1 depicts an embodiment of a system 100 that utilizes link-triggered link-translating proxying as described above. The system includes wireless devices 102 as the Internet-connected devices, a wireless service provider network 104 as the access network, the Internet 106, a content source 108, and a LTPS 110. As used herein, an access network is a network that provides access to the Internet by end-user/client devices such as desktop computers, laptop computers, pad computers, tablets, eBooks readers, game consoles, set-top devices, and Smartphones. Typical access networks include wireless service provider networks (e.g. that offer 3G, 4G and/or WiFi access) and ISPs (e.g., that offer dial-up, DSL, and/or cable modem access). A private enterprise network can also serve as an access network if client devices within the private enterprise network can access the Internet through the private enterprise network.

Each one of the wireless devices 102 is typically a handheld wireless device, such as a cell phone, a mobile phone, a smartphone, a pad computer, a Personal Digital Assistant (PDA), a handheld gaming device etc, which can wirelessly communicate using radio frequency (RF) communications signals. The wireless devices may include proxy settings 114, which control certain proxy operations. In an embodiment, the proxy settings do not include the domain name of the LTPS and/or the proxy settings are not configurable by the users of the wireless devices. In another embodiment, modification of the proxy settings requires the users to navigate through a user interface to actively locate and change the proxy settings. In the embodiment of FIG. 1, the wireless devices are equipped with a browser application that allows the wireless device to obtain content from the Internet. The proxy settings, if any, may be native, to and controlled by, the operating system of the wireless device or the proxy settings may be native to, and controlled by, a browser of the wireless device. In an embodiment, the wireless devices are configured to use HTTP to request content from a content source that is Internet-accessible.

The wireless devices 102 can support various different RF communications protocols, including without limitation, Global System for Mobile communications (GSM), Universal Mobile Telecommunications System (UMTS), Code Division Multiple Access (CDMA), Worldwide Interoperability for Microwave Access (WiMax) and communications protocols as defined by the 3$^{rd}$ Generation Partnership Project (3GPP) or the 3$^{rd}$ Generation Partnership Project 2 (3GPP2), 4G Long Term Evolution (LTE), IEEE 802.16 standards bodies, and WiFi. Although some wireless communications protocols are identified herein, it should be understood that present disclosure is not limited to the cited wireless communications protocols.

The wireless service provider network 104 provides a wireless communications interface for the wireless devices 102. In an embodiment, the wireless service provider network is accessible on a subscription basis as is known in the field. In an embodiment, the wireless service provider network is a closed domain that is accessible only by subscribers that are in good standing with the operator of the wireless service provider network. The wireless service provider network may include a radio access network (not shown) and an Internet gateway (not shown). The radio access network includes one or more base stations to facilitate communications among wireless devices that are within a communication range of the base stations. Each base station has at least one RF transceiver and the base stations communicate with the wireless devices using RF communication signals. The radio access network facilitates network communications among multiple wireless devices within the same wireless service provider network and between wireless devices in other wireless service provider networks and provides interfaces to facilitate communications with other entities, such as a Public Switched Telephone Network (PSTN), a Wide Area Network (WAN), the Internet, Internet servers, hosts, etc., which are outside of the wireless service provider network. In an embodiment, the wireless service provider network is operated by a single wireless service provider, such as, for example, AT&T, VERIZON, T-MOBILE, and SPRINT.

Data signals communicated between a wireless device 102 and the wireless service provider network 104 include, but are not limited to, analog and/or digital RF signals (i.e., radio waves) for any type of communication mode, including text messaging, multimedia messaging, voice calling, and Internet browsing. The radio access network can support various different RF communications protocols, including without limitation, GSM, UMTS, CDMA, WiMax and communications protocols as defined by 3GPP, 3GPP2, or IEEE 802.16. Although some wireless communications protocols are identified herein, it should be understood that the present disclosure is not limited to the cited wireless communications protocols.

The Internet gateway (not shown) of the wireless service provider network 104 provides a gateway for communications between the wireless devices 102 and Internet-connected hosts and/or servers, which can also be referred to as the "cloud." The Internet gateway may include a Serving General Packet Radio Service (GPRS) Support Node (SGSN) and a Gateway GPRS Support Node (GGSN). For example, the Internet gateway can be a Wireless Application Protocol (WAP) gateway that converts the WAP protocol used by the wireless service provider network to the HTTP protocol used by the Internet. In an embodiment, the Internet gateway enables wireless devices to access multimedia content, such as HTML, compact HTML (cHTML), and extensible HTML (xHTML), which is stored on Internet-connected hosts and/or servers. In this way, the wireless service provider network is an access network that provides access to the Internet for its subscribers.

The content source 108 is an Internet-connected host or server that is identified by a URI or URL and hosts Internet accessible content. The content source stores content that may be, for example, in the HTML format. Content sources are well known in the field. In an embodiment, the content source stores links that include pointers to the LTPS 110 and additional information that corresponds to URLs for stored content elements. If the content source stores links with a pointer to the LTPS and additional information that corresponds to a URL for the content elements (e.g., the proxy domain appended to the hostname of the content source), when such a link is activated by a user of a wireless device that has browsed to the link, the subsequent request will be routed through the corresponding LTPS. For example, a content source can store the link http://www.website.com.pr0xy.me/about_us/index.html, instead of the link http://www.website.com/about_us/index.html. This causes all requests initiated from the link by an Internet-connected device to pass through the LTPS even though the LTPS is outside the control domain of the access network.

In the example of FIG. 1, the LTPS 110 is located outside of the access network (e.g., wireless service provider network 104) and therefore is not within the control domain of the wireless service provider network. The LTPS is accessible from a wireless device 102 via the wireless service provider network and the Internet 106. In the embodiment of FIG. 1, the operator of the wireless service provider network does not control the operation of the LTPS.

The LTPS 110 performs various link translation functions as described above. For example, the LTPS searches an HTTP response to rewrite/replace the links that are in the response to include a pointer to the LTPS, e.g., the proxy domain appended to the hostname address. It should be understood that the LTPS only receives requests that have been generated from a link that includes a pointer to the LTPS.

Figure 2:
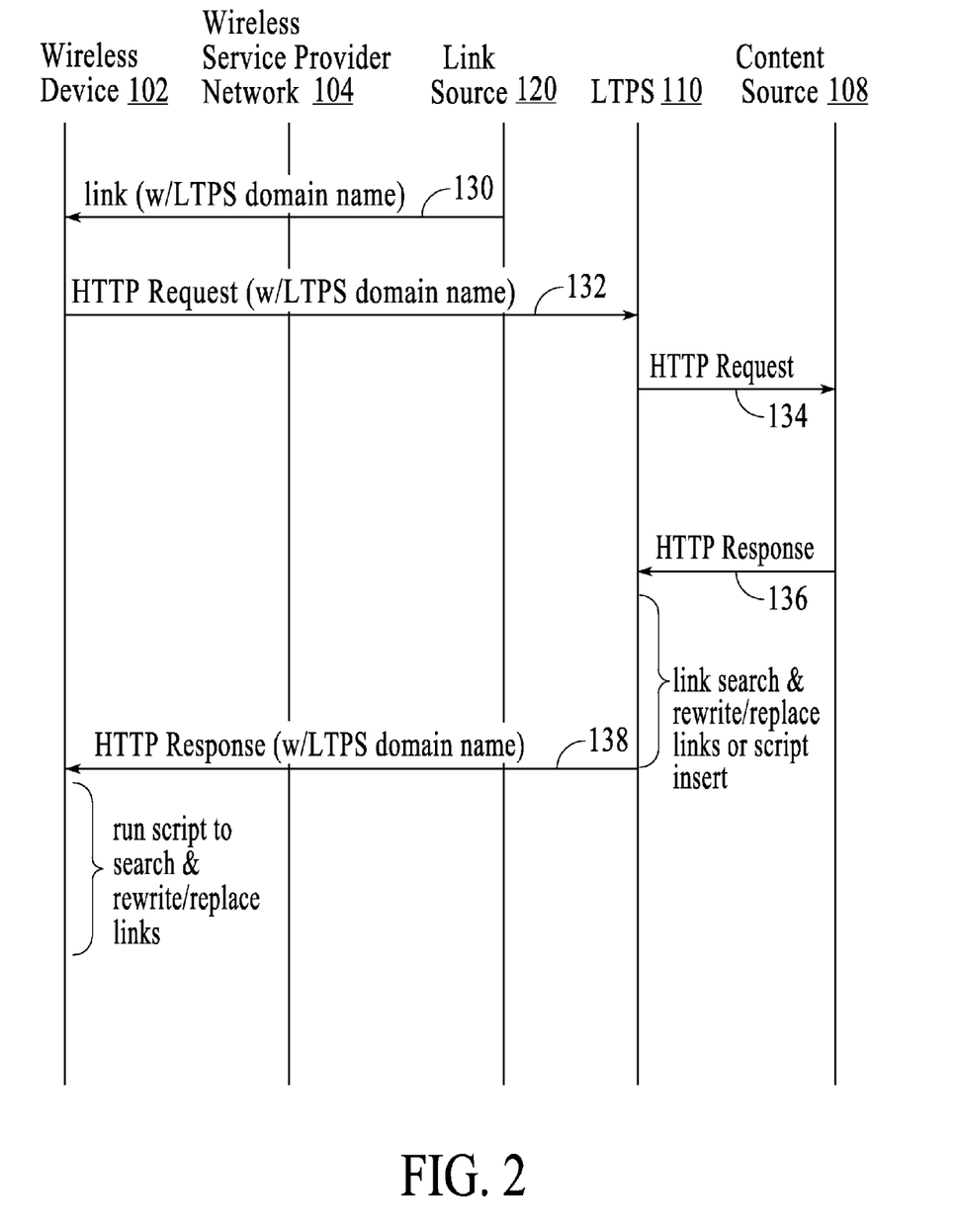
FIG. 2 illustrates an exchange of messages that is used to implement link-triggered link-translation proxying.

FIG. 2 illustrates an exchange of messages that is used to implement link-triggered link-translation proxying according to an embodiment of the invention. Initially, the wireless device 102 obtains a link from a link source 120 via message 130, with the link including a pointer to the LTPS and additional information that corresponds to the URL for a content element. For example, the link http://www.website.com.pr0xy.me/about_us/index.html is obtained by the wireless device from the link source. The link can be obtained by the wireless device from many different sources including, for example, the link was bookmarked in a browser of the wireless device, the link was sent to the wireless device via a non-HTTP message (e.g., IM/SMS/email message), obtained via MMS, TWITTER, FACEBOOK, etc., the link was found on a web page, a content provider uses such links, a URL shortening system uses this system, or the link was typed into the address bar of the wireless device's browser by a user of the wireless device. In an embodiment, links including a pointer to the LTPS and additional information that corresponds to a URL for the content can be pre-installed into the wireless device (e.g., as "favorites" in the device's browser) such that the links are entered into the address bar of the browser upon activation of the link by the user. This type of pre-installation of modified links does not change or affect the proxy settings of the wireless device's operating system or browser.

Using the link, the wireless device 102 makes a request 132 (e.g., an HTTP request) to obtain the corresponding content. For example, the link is entered into the address bar of the wireless device browser, thereby triggering an HTTP request to be sent from the wireless device to the LTPS 110. In an embodiment, the headers portion of the HTTP request includes the domain name of the LTPS and the additional information that corresponds to the URL for the requested content. The LTPS receives the request because the request is directed to the domain name identified in the link. The LTPS in turn makes an HTTP request 134 for the content to the content source 108 that is identified in the link. In response to the HTTP request, an HTTP response 136 is provided to the LTPS from the content source. The HTTP response includes the content requested by the wireless device (e.g., the HTML page, images, CSS, Javascript) along with an HTTP header. The LTPS then provides a modified version of the HTTP response 138, which includes the requested content and an HTTP header, to the wireless device. In an embodiment, the HTTP response is modified such that the HTTP header and the links in the requested content are rewritten/replaced to include a pointer to the LTPS. For example, a link to http://www.website.com/contact_us.html, which is embedded in the response, is rewritten/replaced with the link http://www.website.com.pr0xy.me/contact_us.html. In one embodiment, the links in the response are searched for and rewritten/replaced by the LTPS and sent to the wireless device in the rewritten/replaced form. In another embodiment, the HTTP response is modified so that the wireless device itself can search for and rewrite/replace the links. For example, the LTPS inserts a script (e.g., JavaScript) or a pointer to a script into HTTP responses of content type HTML or XHTML that causes the wireless device to search and rewrite/replace the links of the displayed content. For example, a link to http://www.website.com/contact_us.html, which is embedded in the HTTP response, is rewritten/replaced by the wireless device with the link http://www.website.com.pr0xy.me/contact_us.html.

In an embodiment, the LTPS 110 can inject content into the response that is provided to the requesting wireless device. For example, the LTPS can inject code (e.g., JavaScript) into HTML pages, which is executed on the wireless device by the device's browser. The executed code may perform a function that is transparent to the user of the wireless device and/or the executed code may cause the display of, for example, a widget, a widget toolbar, an application, an application toolbar, an advertisement, or some other content, on the requesting device. This content can be displayed in addition to or in place of the content that is received from the content source. In an embodiment, the requested content is modified so that the inserted content causes an application toolbar to be displayed adjacent to the requested content. In another embodiment, the inserted content causes an application toolbar to be semi-transparently displayed over top of the requested content such that the requested content and the toolbar are displayed simultaneously. In another embodiment, the requested content is modified so that the injected content is displayed before the requested content is displayed or after the requested content is displayed.

Figure 3:
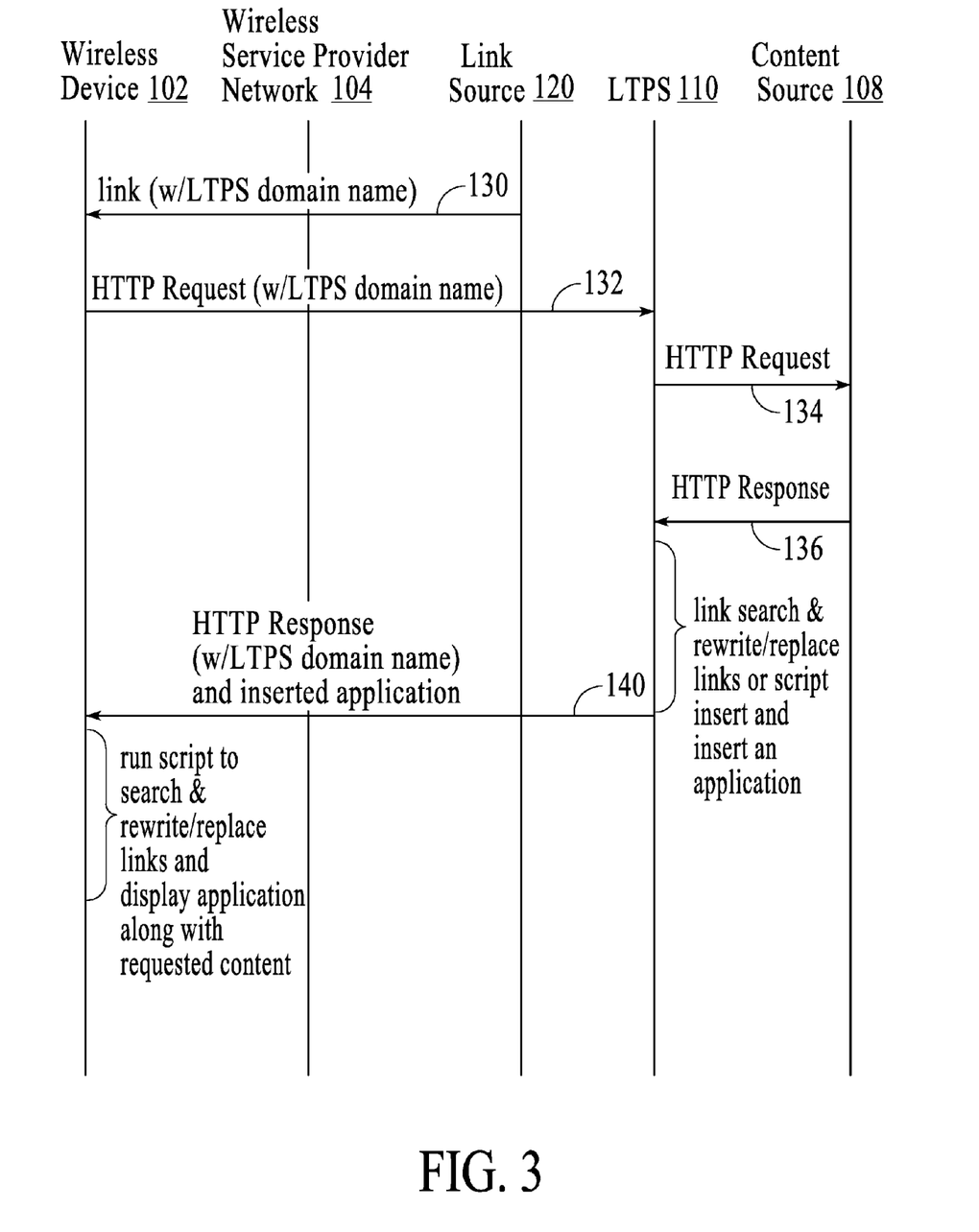
FIG. 3 illustrates an exchange of messages that is used to implement link-triggered link-translation proxying with the insertion of an application.
Figure 4A:
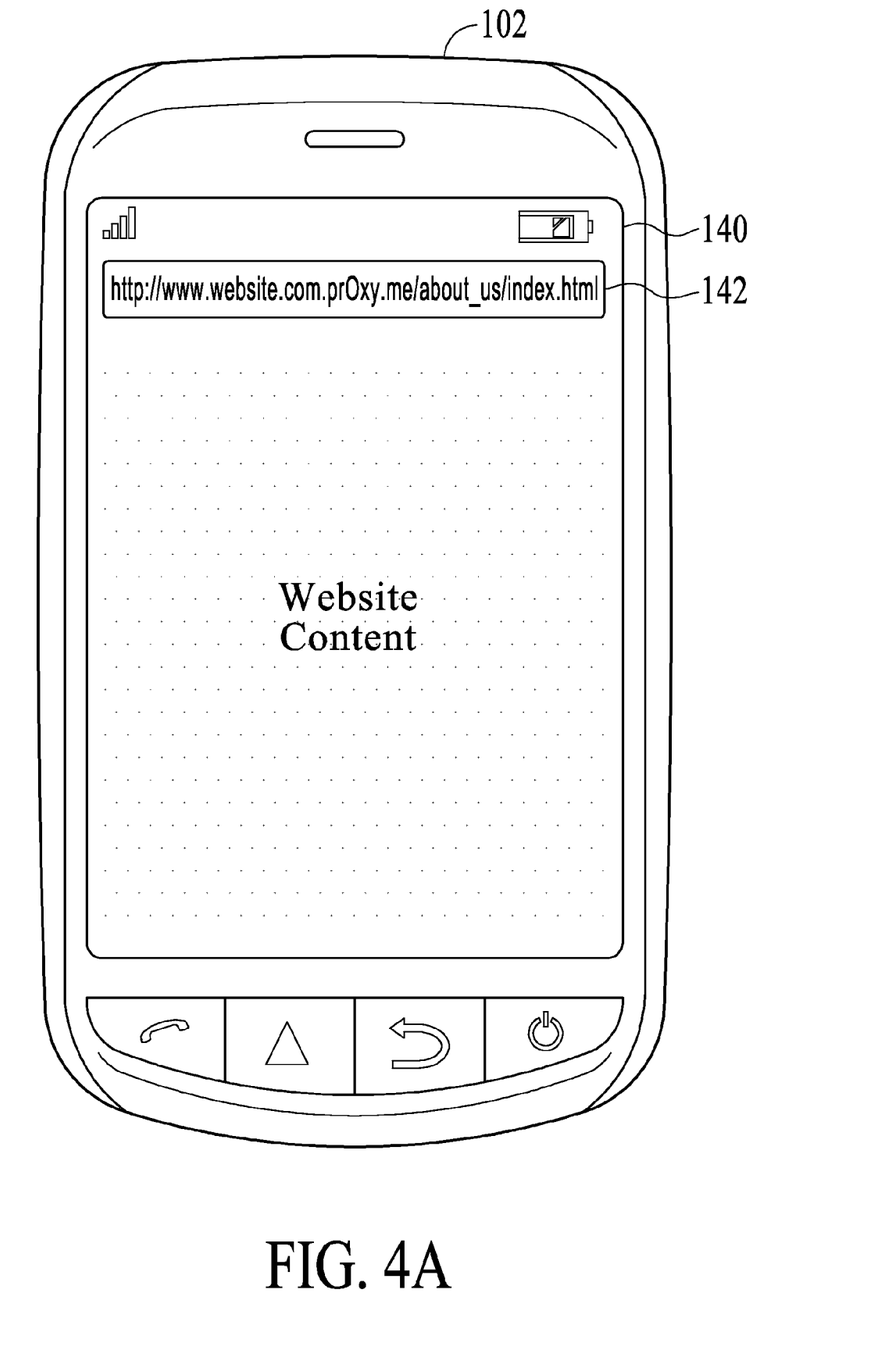
FIG. 4A depicts a wireless device that is displaying content that was received through a LTPS using link-triggered link-translation proxying.
Figure 4B:
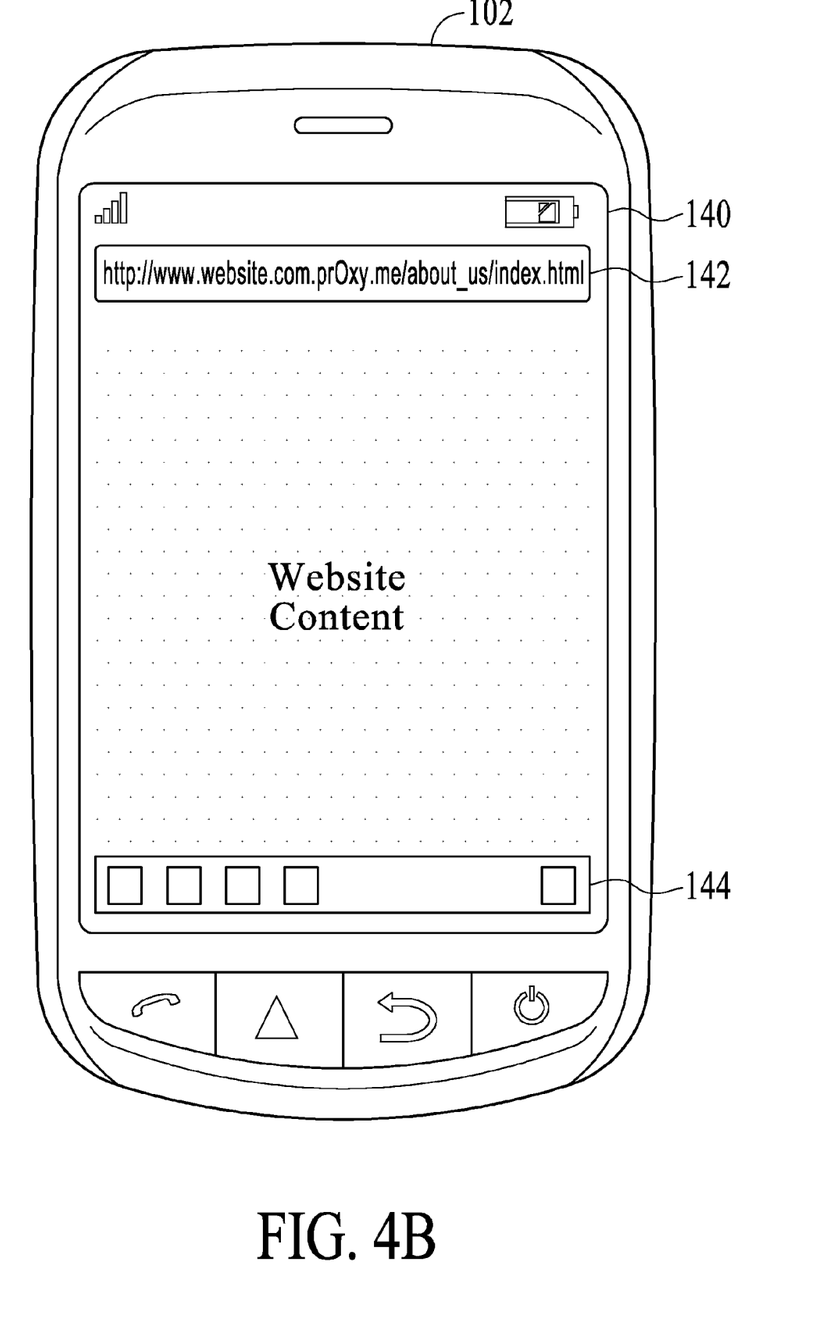
FIG. 4B depicts a wireless device that is displaying an application toolbar that was inserted by a LTPS using link-triggered link-translation proxying in addition to requested content, the application toolbar being displayed adjacent to the requested content.
Figure 4C:
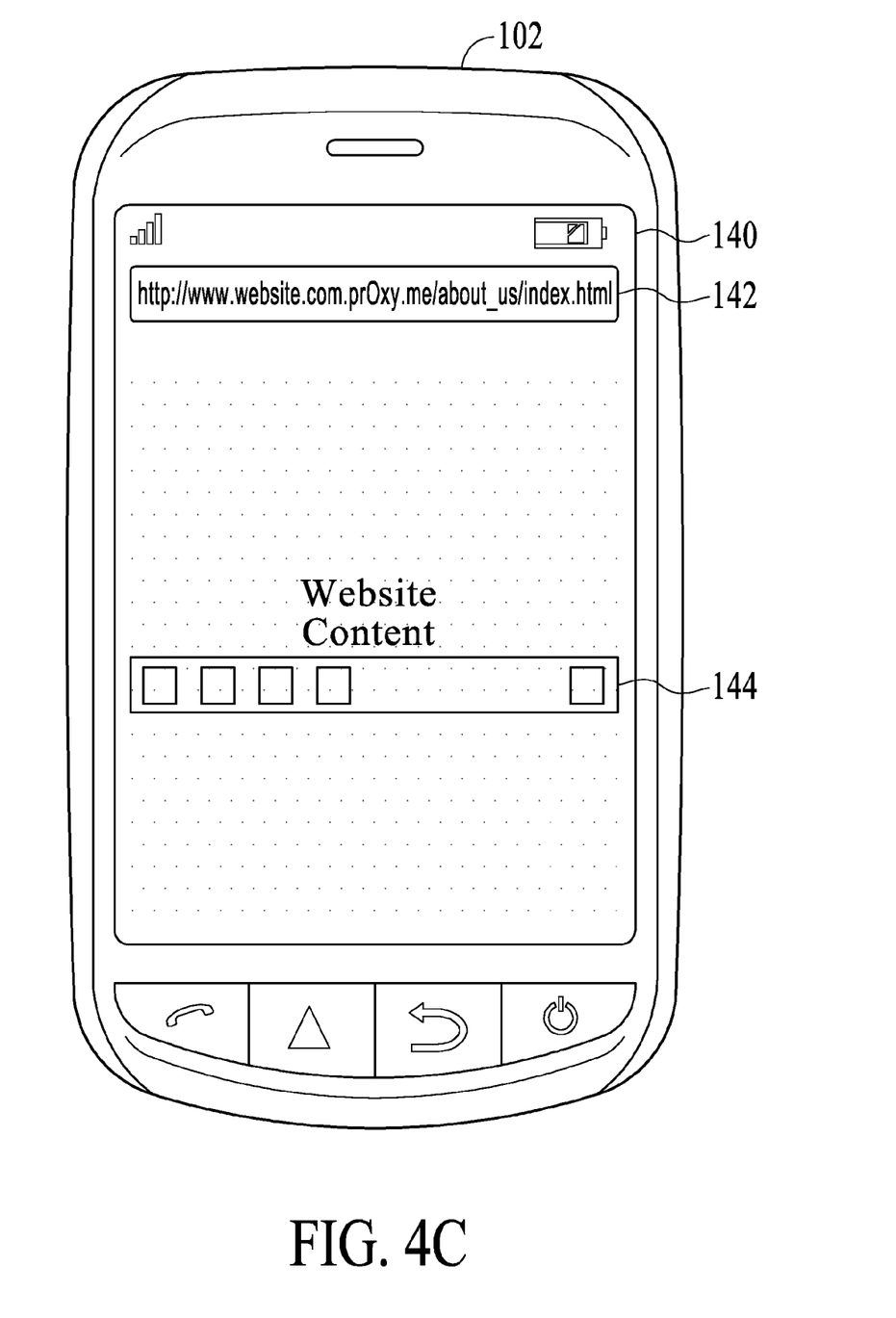
FIG. 4C depicts a wireless device that is displaying an application toolbar that was inserted by a LTPS using link-triggered link-translation proxying in addition to requested content, the application toolbar being displayed as a transparent application toolbar over the requested content.

FIG. 3 illustrates an exchange of messages that is used to implement link-triggered link-translation proxying as described above with reference to FIG. 2. The operation of FIG. 3 is similar to that of FIG. 2 except that the LTPS 110 inserts content into the HTTP response 140 that causes the display of an application along with the requested content. For example, the LTPS injects code (e.g., JavaScript), which causes the display of a widget, a widget toolbar, an application, an application toolbar, an advertisement, or some other content, on the requesting wireless device 102. FIG. 4A depicts a wireless device 102 that has a display 140 that is displaying content that was received through the LTPS 110 as described above with reference to FIG. 2. As depicted, an address bar 142 includes the proxy domain appended to the hostname of the content source. In the case of FIG. 4A, the LTPS has not inserted content (e.g., an application toolbar and/or an advertisement) into the request that is displayed along with the requested content. Therefore, only the requested content is displayed. FIG. 4B depicts the wireless device displaying content that was received through the LTPS as described above with reference to FIG. 3. Here, the address bar 142 includes the proxy domain appended to the hostname of the content source. In the case of FIG. 4B, the LTPS has inserted content (e.g., an application and/or an advertisement) that causes an application toolbar 144 to be displayed along with the requested content. The inserted content is displayed in addition to the requested content that is received from the content source. In the embodiment of FIG. 4B, the inserted content is displayed adjacent to the requested content and the sizing of the requested content is adjusted to accommodate the inserted content on the display. In an alternative embodiment, the LTPS inserts an application that causes content (e.g., an application toolbar and/or an advertisement) to be displayed over top of the requested content in a semi-transparent manner such that the requested content and the inserted content are displayed simultaneously. FIG. 4C depicts the wireless device displaying content that was received through the LTPS as described above in addition to inserted content 146 that is displayed over top of the requested content in a semi-transparent manner such that the requested content and the inserted content are displayed simultaneously. Other simultaneous display options are possible.

Figure 5:
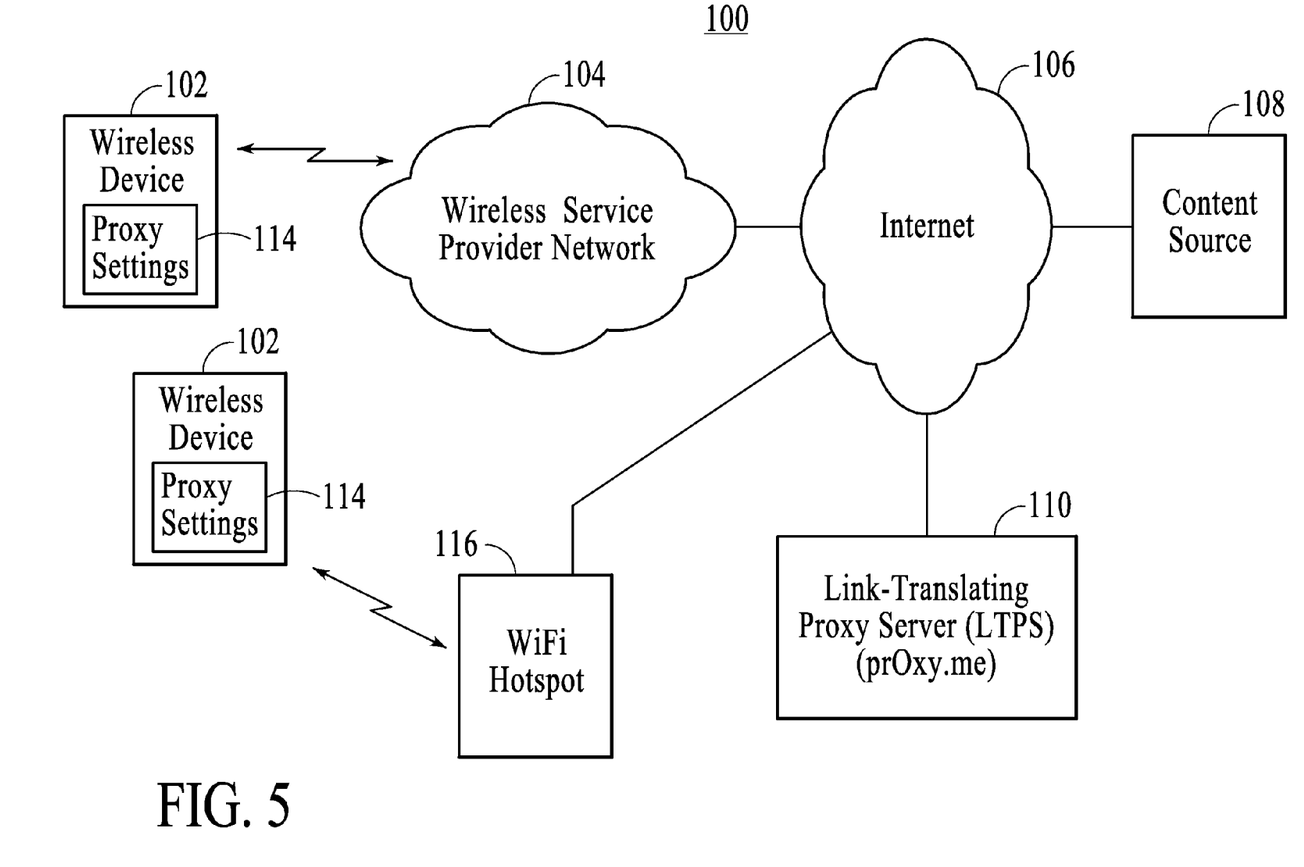
FIG. 5 depicts an embodiment of a system that utilizes link-triggered link-translation proxying that passes through a wireless hotspot instead of a wireless service provider network.

FIG. 5 depicts an embodiment of a system that utilizes link-triggered link-translation proxying that passes through a wireless hotspot as the access network instead of a wireless service provider network as the access network. In particular, FIG. 5 depicts an embodiment of the system 100 of FIG. 1 that includes the wireless devices 102, the wireless service provider network 104, the Internet 106, the content source 108, the LTPS 110, and a wireless hotspot 116. In the case of FIG. 5, one of the wireless devices utilizes WiFi capability of the wireless device to connect to the wireless hotspot and accesses the Internet through the wireless hotspot instead of the through the wireless service provider network. Because the above-described technique is triggered by the wireless device activating a link that includes a pointer to the LTPS and additional information that corresponds to a URL for the content element, a request from the wireless device can be delivered to the LTPS via the wireless hotspot and the Internet without passing through the wireless service provider network 104. Therefore, the technique is not dependent on the request passing through the wireless service provider network. That is, the technique works independent of whether the wireless device is making the request via the wireless service provider network or via the wireless hotspot (e.g., WiFi or WiMax hotspot) that offers wireless access to the Internet. The operation would be the same if the wireless hotspot was replaced with a private Internet access network such as a corporate enterprise network that provides access to the Internet. In this case, a device within the enterprise network that activates such a link will be directed through the LTPS.

Although the above-described technique is described as being used in an environment that involves a request (e.g., an HTTP request) that is sent from a wireless device 102 via a wireless service provider network 104 or via a wireless hotspot, the technique is applicable to requests sent from devices that access the Internet through other types of access networks. For example, the technique is applicable to requests from wired devices via a wired access network (e.g., cable modem, DSL, dial-up, enterprise, etc).

As described above, the LTPS can perform code insertion in addition to the link translation functionality. Because the LTPS is in the data path of the transactions described with reference to FIGS. 2 and 3, the LTPS can be configured to perform additional traffic mediation functionality. For example, the LTPS may modify the content that is provided to the requesting device, insert data into the content that is provided to the requesting device, monitor the data that is provided to the requesting device, and/or monitor information related to the data transfers. In an embodiment, the LTPS functions as a mediation system that includes modules to perform the link translating proxy server functionality described above as well as modules to perform monitoring and to provide additional services. In an embodiment, the LTPS includes a monitoring module (not shown) that is configured to monitor the network activities of the requesting devices. For example, the monitoring module can monitor which websites were visited, how long did users of the device stay at the website, how much data was transferred, what types of network resources were accessed, etc. The monitoring module may store data regarding the monitored network activities of the devices so that the stored data can be used for various purposes.

In an embodiment, the LTPS includes a service providing module that is configured to provide one or more services to the requesting devices. As an example, the service providing module may use data regarding the monitored network activities of the devices to send targeted or customized advertisements, e.g., embedded in one or more requested content elements, to the devices based on the recent or historic network activities of the devices. As another example, the service providing module may use the data regarding the monitored network activities of the devices to send price comparison data on one or more items that were accessed by the devices at shopping websites. As another example, the service providing module may use the data regarding the monitored network activities of the devices to provide user analytics, i.e., information about the users based on the network activities of the users via the devices, to one or more requesting parties. Other examples include the service providing module being configured to (1) take action based on the substance of the content elements (e.g., underlining all phone numbers on a received webpage), (2) overlay user interface elements on top of the received content elements (e.g., overlaying a toolbar providing various kinds of functionality to the user), and (3) inject arbitrary Javascripts or other types of programming scripts for execution on the user device.

Although the operations herein are shown and described in a particular order, the order of the operations may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations may be implemented using software instructions stored on a computer useable storage medium for execution by a computer such as the wireless devices 102, the LTPS 110, and/or the content source 108. As an example, an embodiment of a computer program product includes a non-transitory computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device.

The computer-useable or computer-readable medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Figure 6:
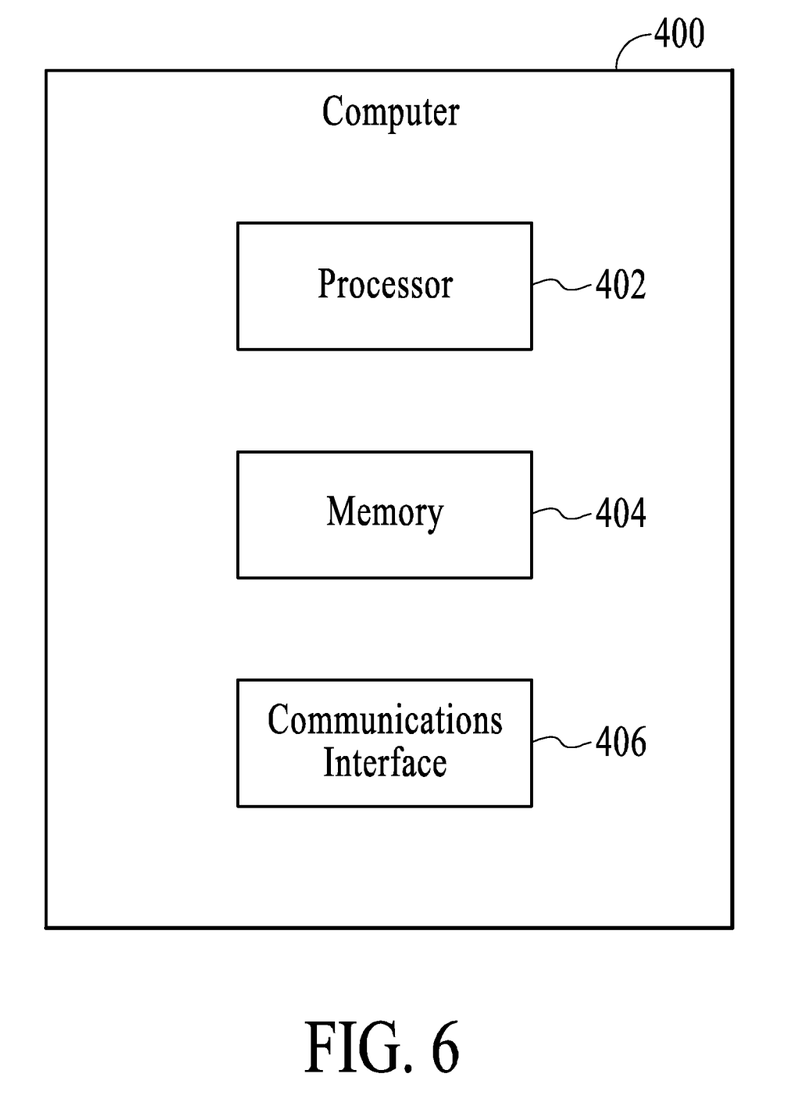
FIG. 6 depicts a computer that includes a processor, memory, and a communications interface.

In an embodiment, at least one of the functionalities described above is performed by a computer such as the wireless devices 102, the LTPS 110, and/or the content source 108 that executes computer readable instructions. FIG. 6 depicts a computer 400 that includes a processor 402, memory 404, and a communications interface 406. The processor may include a multifunction processor and/or an application-specific processor. Examples of processors include the PowerPC™ family of processors by IBM and the x86 family of processors by Intel. The memory within the computer may include, for example, a non-transitory storage medium such as read only memory (ROM), flash memory, RAM, and a large capacity permanent storage device such as a hard disk drive. The communications interface enables communications with other computers via, for example, the Internet Protocol (IP). The computer executes computer readable instructions stored in the storage medium to implement various tasks as described above.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for obtaining web content at an Internet-connected device from an Internet accessible content source, wherein the device connects to the Internet via an access network, the method comprising:

obtaining, at the device, a link to a content element that is stored at the internet accessible content source, wherein the link includes a domain of a link translating proxy server (LTPS) that is located outside of the access network and additional information that corresponds to a URL for the content element;

initiating, from the device, a request for the content element that is associated with the link, the request being directed to the LTPS; and receiving, at the device, a response that includes the requested content, the response passing through the LTPS, which has used the additional information to translate the link to the URL for the content element, wherein the response includes an application inserted by the LTPS that, when executed by the device, displays content other than the requested content on a display of the device in addition to the requested content.

2. The method of claim 1, wherein the additional information in the link comprises the URL for the content element.

3. The method of claim 1, wherein the additional information in the link comprises a key that is associated with the URL for the content element.

4. The method of claim 1, wherein initiating the request comprises generating an HTTP request header that includes the domain of the LTPS and the additional information that corresponds to the URL for the content element.

5. The method of claim 1, wherein the response includes links that have been rewritten/replaced by the LTPS to include the domain of the LTPS.

6. The method of claim 1, wherein the response includes a script or a reference to a script inserted by the LTPS, which causes the device to rewrite/replace links in the response to include the pointer to the LTPS.

7. The method of claim 1, wherein the link is obtained without changing any proxy settings of the device.

8. The method of claim 1, wherein the proxy settings of the device do not include the domain of the LTPS.

9. The method of claim 1, wherein the link is obtained via a browser on the device.

10. The method of claim 1, wherein the link is sent to the device in a non-HTTP message.

11. The method of claim 10, wherein the non-HTTP message is an instant message (IM), a short message service (SMS) message, or an email message.

12. A link translating proxy server (LTPS) comprising:
a proxy domain that is outside an access network;
a processor;
memory that stores computer program code which, when executed by the processor, performs the following operations;
receiving, via the Internet, a request from a device for a content element that is associated with a link, the link, as received, including the proxy domain of the LTPS and additional information that corresponds to a URL for the content element;
translating the link into the URL for the content element using the additional information;
sending a request to a content source using the URL for the content element;
receiving a response from the content source, the response including the requested content;
modifying the response, the modifying including inserting an application into the response, wherein the application, when executed by the device, displays content other than the requested content on a display of the device in addition to the requested content; and
forwarding the response to the device.

13. The LTPS of claim 12, further comprising computer program code which, when executed by the processor, performs the following operation:
replacing/rewriting links in the response to include the domain of the LTPS and forwarding the response, including the replaced/rewritten links, to the device.

14. The LTPS of claim 12, further comprising computer program code which, when executed by the processor, performs the following operation:
inserting script into the response, the script causing the device to replace/rewrite links in the response to include the domain of the LTPS.

15. The method of claim 1, wherein the content other than the requested content is displayed over the top of the requested content.

16. The method of claim 1, wherein the content other than the requested content is displayed partially transparent over the top of the requested content.

17. The method of claim 1, wherein the content other than the requested content is displayed before or after the requested content is displayed.

18. The LTPS of claim 12, wherein the inserted application, when executed by the device, displays the content other than the requested content over the top of the requested content.

19. The LTPS of claim 12, wherein the inserted application, when executed by the device, displays the content other than the requested content partially transparent over the top of the requested content.

20. The LTPS of claim 12, wherein the inserted application, when executed by the device, displays the content other than the requested content before or after the requested content is displayed.

21. A device configured to obtain web content from an Internet accessible content source, wherein the device connects to the Internet via an access network, the device comprising:
a processor;
memory that stores computer program code which, when executed by the processor, performs the following operations:
initiating, from the device, a request for a content element that is stored at the internet accessible content source by following a link associated with the content element, wherein the link includes a domain of a link translating proxy server (LTPS) that is located outside of the access network and additional information that corresponds to a URL for the content element, the request being directed to the LTPS; and
receiving, at the device, a response that includes the requested content, the response passing through the LTPS, which has used the additional information to translate the link to the URL for the content element, wherein the response includes an application inserted by the LTPS that, when executed by the device, displays content other than the requested content on a display of the device in addition to the requested content.

* * * * *